US008389934B2

(12) United States Patent
Dzepina et al.

(10) Patent No.: US 8,389,934 B2
(45) Date of Patent: Mar. 5, 2013

(54) HEATED TIME OF FLIGHT SOURCE

(75) Inventors: Mihajlo Dzepina, Toronto (CA); William Loyd, Sugar Land, TX (US); Gregor Sprah, Mississauga (CA)

(73) Assignee: DH Technologies Development Pte. Ltd., Singapore (SG)

( * ) Notice: Subject to any disclaimer, the term of this patent is extended or adjusted under 35 U.S.C. 154(b) by 252 days.

(21) Appl. No.: 12/732,426

(22) Filed: Mar. 26, 2010

(65) Prior Publication Data

US 2010/0243881 A1 Sep. 30, 2010

Related U.S. Application Data

(60) Provisional application No. 61/164,088, filed on Mar. 27, 2009.

(51) Int. Cl.
*B01D 59/44* (2006.01)
*H01J 49/00* (2006.01)

(52) U.S. Cl. ......................... 250/288; 250/281; 250/287

(58) Field of Classification Search .................. 250/288, 250/281, 287
See application file for complete search history.

(56) References Cited

U.S. PATENT DOCUMENTS

| | | | | |
|---|---|---|---|---|
| 3,502,868 | A * | 3/1970 | Gentsch | 250/282 |
| 3,655,963 | A * | 4/1972 | Brunnee et al. | 250/281 |
| 3,697,748 | A * | 10/1972 | Cohen | 250/282 |
| 4,745,277 | A * | 5/1988 | Banar et al. | 250/288 |
| 4,985,634 | A * | 1/1991 | Stengl et al. | 250/492.2 |
| 5,633,496 | A * | 5/1997 | Sakairi et al. | 250/288 |
| 6,014,263 | A * | 1/2000 | Schaeffer et al. | 359/642 |
| 6,855,924 | B2 * | 2/2005 | Kobayashi et al. | 250/287 |
| 7,405,396 | B2 * | 7/2008 | Cygan et al. | 250/288 |
| 2002/0036262 | A1 * | 3/2002 | Bowdler et al. | 250/287 |
| 2002/0145808 | A1 * | 10/2002 | Freitag et al. | 359/642 |
| 2004/0108453 | A1 | 6/2004 | Kobayashi et al. | |
| 2006/0255294 | A1 * | 11/2006 | Martin, III | 250/492.3 |

OTHER PUBLICATIONS

"Notification Concerning Transmittal of International Preliminary Report on Patentability (Chapter I of the Patent Cooperation Treaty)" for PCT/US2010/028749, Oct. 6, 2011, 7 pages, The International Bureau of WIPO, Geneva, Switzerland.

"Notification of Transmittal of the International Search Report and the Written Opinion of the International Searching Authority, or the Declaration" for PCT/US2010/028749, May 25, 2010, 11 pages, International Searching Authority/US, Alexandria, VA, US.

* cited by examiner

*Primary Examiner* — Nikita Wells
*Assistant Examiner* — Johnnie L Smith
(74) *Attorney, Agent, or Firm* — Kurt Rauschenbach; Rauschenbach Patent Law Group, LLC

(57) ABSTRACT

A lens assembly for use in mass spectrometry and a method for reducing contaminant build up on ion optic components in a lens assembly for use in a mass spectrometer are disclosed herein. In various embodiments of applicant's teachings, the lens assembly comprises a plurality of ion optic components assembled to form an ion lens and a heater. The plurality of ion optic components has a generally similar expansion coefficient. The heater is operatively coupled to the ion optic components. The heater heats the ion optic components to reduce the accumulation of debris on the ion optic components. In various embodiments, the method includes receiving, in a lens assembly, ions from an ion source. The lens assembly includes a plurality of ion optic components assembled to form an ion lens, the plurality of ion optic components having a generally similar expansion coefficient. The method also comprises heating the ion optic components to a first temperature.

28 Claims, 7 Drawing Sheets

| | 4800 Source | RR Source 50°C | RR Source 75°C |
|---|---|---|---|

Extraction Electrode (Front)

Extraction Electrode (Front)

Extraction Electrode Black Light (Front)

Extraction Electrode (Black)

Source 1 Focus Lens (Front)

HEATED TIME OF FLIGHT SOURCE

CROSS REFERENCE TO RELATED APPLICATIONS

This patent application claims priority to U.S. Provisional Patent Application Ser. No. 61/164,088, filed on Mar. 27, 2009, the entire disclosure of these patent applications are incorporated herein by reference.

FIELD

Applicants' teachings relate to apparatuses and methods of cleaning ion optic components.

INTRODUCTION

Ion optic components are used for focusing ions in mass spectrometry. Specifically, they are used to direct a stream of ions into a mass spectrometer where the ions can be analyzed. An example of a mass spectrometry technique in which ion optical components are used is time-of-flight mass spectrometry (TOF-MS). In TOF-MS, ions are generated by an ion source such as a matrix-assisted laser desorption ionization (MALDI) ion source. Specifically, a laser is used to ablate a sample to produce ions, which are then focused by the ion optics into a time-of-flight (TOF) mass analyzer. However, during this process the laser not only ablates the substance that is to be analyzed but it also ablates the matrix that surrounds the substance. This produces debris that can contaminate the ion optics.

As a consequence of the accumulation of debris, the sensitivity of the ion optic components becomes diminished. The accumulation of contaminants may reduce the effectiveness of an ion lens by limiting the passage of ions therethrough or creating a nonconductive surface, which can adversely affect the ion focusing property of the lens.

Consequently, the ion optic components are generally mechanically cleaned from time to time to remove the contaminants and restore the performance of the instrument. This cleaning of the ion optics can be inconvenient and can result in an interruption of workflow. Specifically, mechanical cleaning can involve significant instrument downtime because gaining access to the affected ion optic components may require a complete or partial vacuum break in the lens assembly. Such down-time can be inconvenient and result in reduction of sample throughput.

SUMMARY

The following summary and introduction is intended to introduce the reader to this specification but not to define any invention. One or more inventions may reside in a combination or sub-combination of the apparatus elements or method steps described below or in other parts of this document. The inventor does not waive or disclaim his rights to any invention or inventions disclosed in this specification merely by not describing such other invention or inventions in the claims.

Some embodiments relate to a lens assembly for use in mass spectrometry. In various embodiments of applicant's teachings, the lens assembly comprises: a plurality of ion optic components assembled to form an ion lens and a heater. The plurality of ion optic components has a generally similar expansion coefficient. The heater is operatively coupled to the ion optic components. The heater heats the ion optic components to reduce the accumulation of debris on the ion optic components.

In some embodiments, the plurality of ion optic components include at least one lens component and at least one insulator. In various embodiments, the at least one lens component and the at least one insulator have a generally similar expansion coefficient. In some embodiments, the at least one lens component is comprised of molybdenum. In some embodiments, the at least one insulator is comprised of Alumina.

In various embodiments, the lens assembly further comprises a housing. The housing mounted to the plurality of ion optic components.

In some embodiments, the heater is mounted to the housing.

In some embodiments according to applicants' teachings, the heater is a plurality of heaters operatively coupled to the ion optic components.

In various embodiments, the heater is a plurality of heaters operatively coupled to the ion optic components, the plurality of heaters evenly distributed across a perimeter of the housing.

In some embodiments, the plurality of ion optic components further comprise an extraction lens. The extraction lens and at least one of the insulators define a common edge. The extraction lens and the insulator are shaped to minimize an electric field concentration at the common edge.

In various embodiments, the extraction lens includes a protrusion extending the length of the common edge.

In some embodiments, the extraction lens includes a plurality of holes. The holes allow airflow.

In various embodiments, the extraction lens is comprised of molybdenum.

In various embodiments according to applicant's teachings, the plurality of ion optics components further comprise a focus lens operatively coupled to the extraction lens; a ground lens operatively coupled to the focus lens; and an Einzel lens operatively coupled to the ground lens.

In some embodiments, the focus lens is comprised of molybdenum.

In various embodiments, the insulator is comprised of alumina.

In various embodiments, at least a portion of the lens assembly is coated with a glaze.

Various embodiments according to applicant's teachings relate to a method for reducing contaminant build up on ion optic components in a lens assembly for use in a mass spectrometer. In various embodiments, the method includes receiving in a lens assembly ions from an ion source. The lens assembly includes a plurality of ion optic components assembled to form an ion lens, the plurality of ion optic components having a generally similar expansion coefficient. The method also comprises heating the ion optic components to a first temperature.

In some embodiments, the method further includes periodically stopping operation of the mass spectrometer and heating the ion optic components to a second temperature.

In some embodiments, the second temperature is higher than the first temperature.

In various embodiments, the period is determined when sensitivity falls below a threshold.

In some embodiments, the threshold is greater than 50% of initial sensitivity.

In some embodiments, the period is substantially equal to a week.

In some embodiments, the ion source is a MALDI ion source.

In some embodiments, matrix is collected the operation is stopped the ion optic components are heated to a second temperature.

In some embodiments, the step of collecting matrix comprises providing a surface under the source lens.

In some embodiments, the surface is at a third temperature. The third temperature is lower than the second temperature.

In some embodiments, the third temperature is sufficiently low to induce condensation on the surface.

In various embodiments, the first temperature is greater than 45° C. In some embodiments, the first temperature is approximately 50° C.

In some embodiments, the second temperature is approximately 190° C.

DRAWINGS

The skilled person in the art will understand that the drawings, described below, are for illustration purposes only. The drawings are not intended to limit the scope of the applicants' teachings in any way.

Figure 1A:
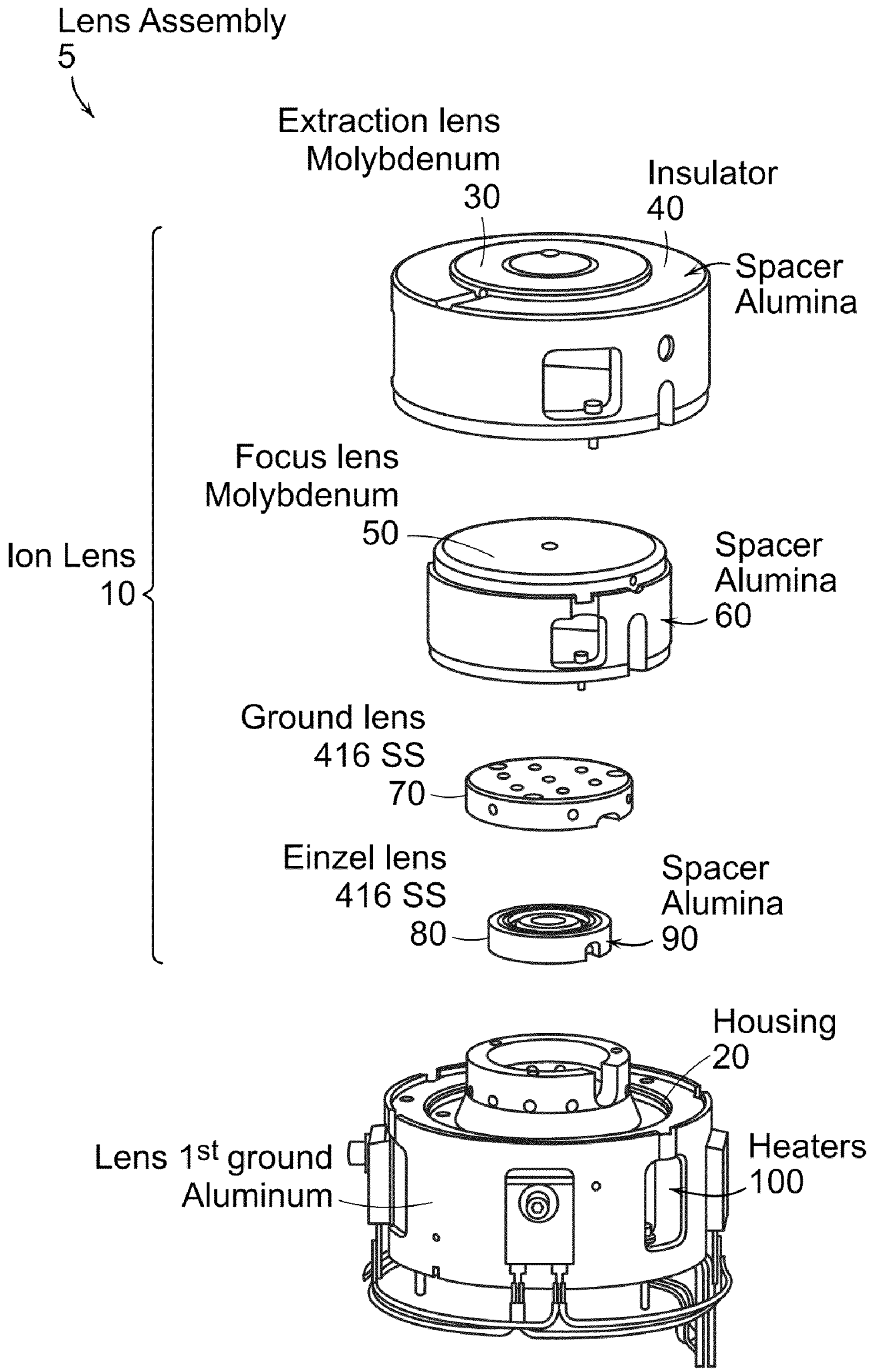
FIG. 1A is schematic diagram illustrating an exploded view of a lens assembly according to various embodiments of applicants' teachings.
Figure 2A:
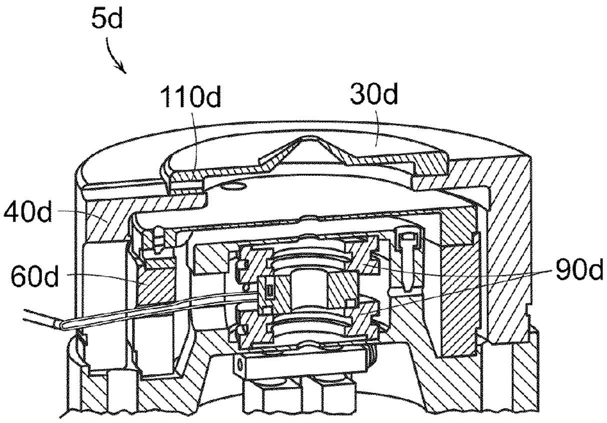
Figure 2B:
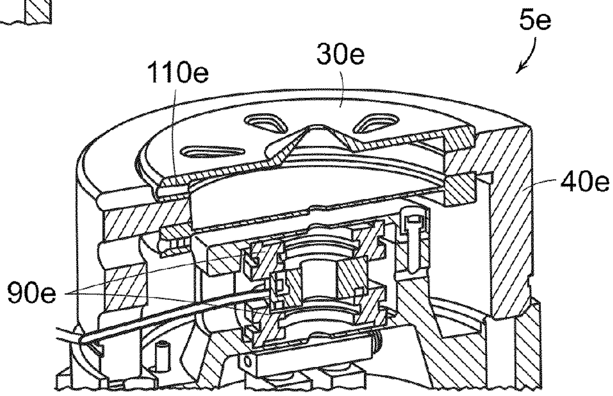
Figure 2C:
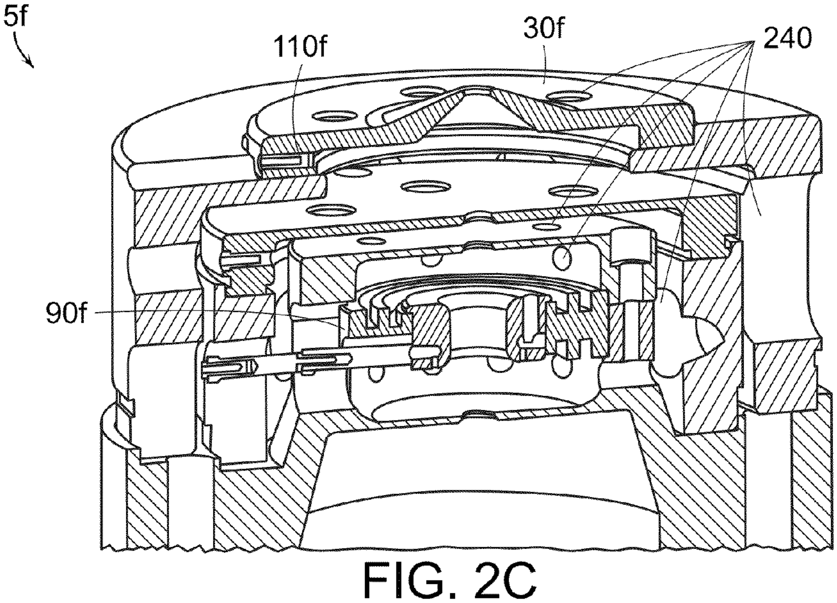
Figure 3:
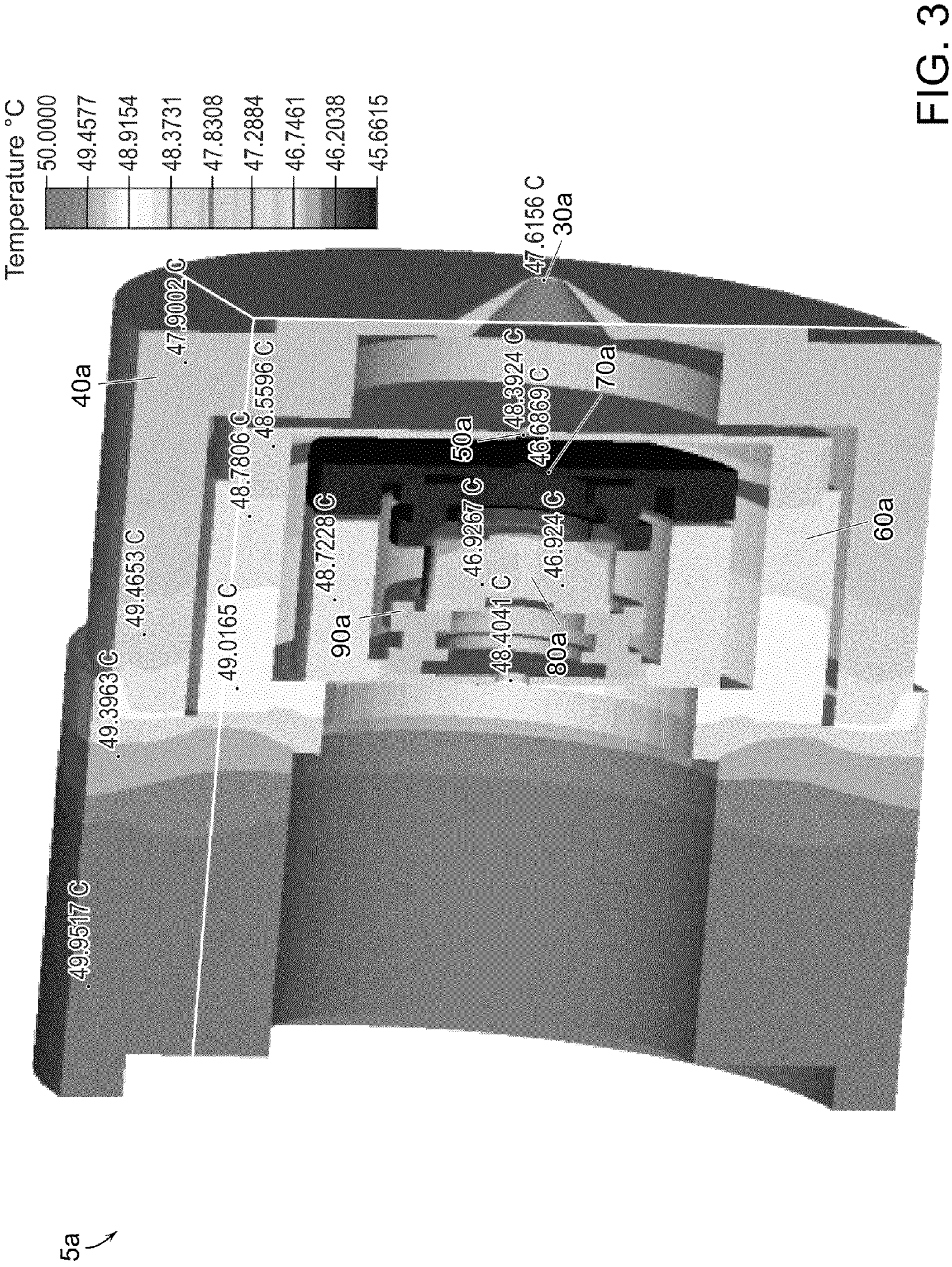
Figure 4:
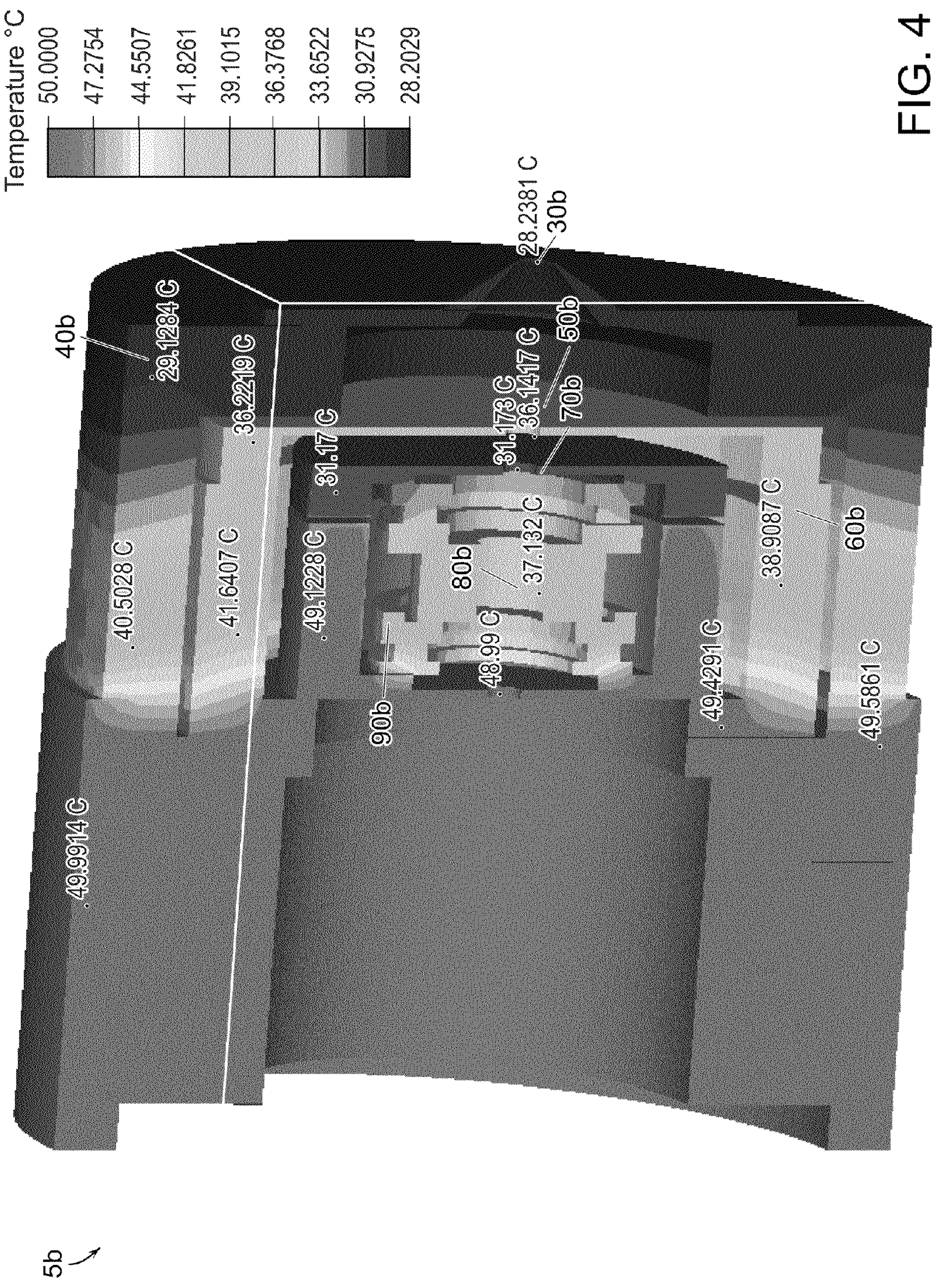
Figure 5A:
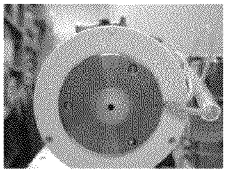
Figure 5B:
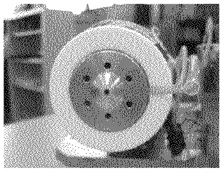
Figure 5C:
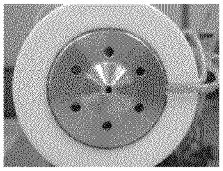
Figure 5D:
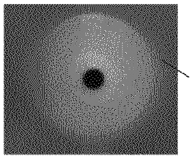
Figure 5E:
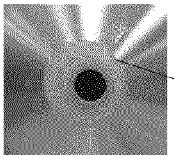
Figure 5F:
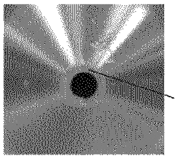
Figure 5G:
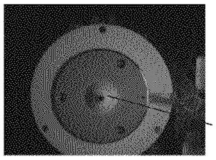
Figure 5H:
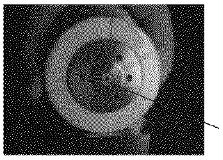
Figure 5I:
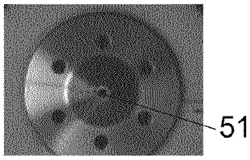
Figure 5J:
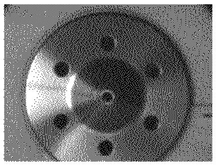
Figure 5K:
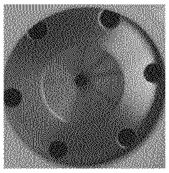
Figure 5L:
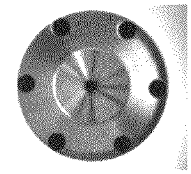
Figure 5M:
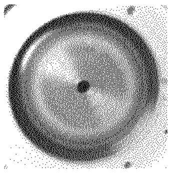
Figure 5N:
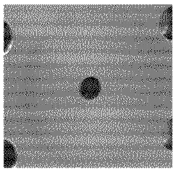
Figure 5O:
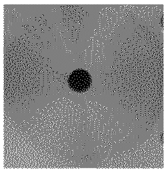
Figure 6:
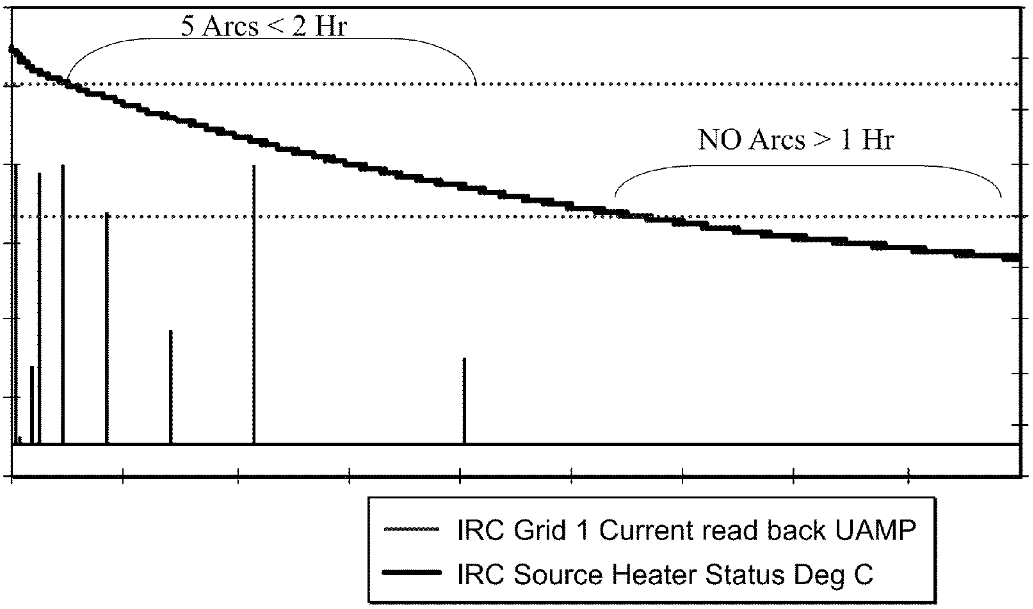
Figure 7:
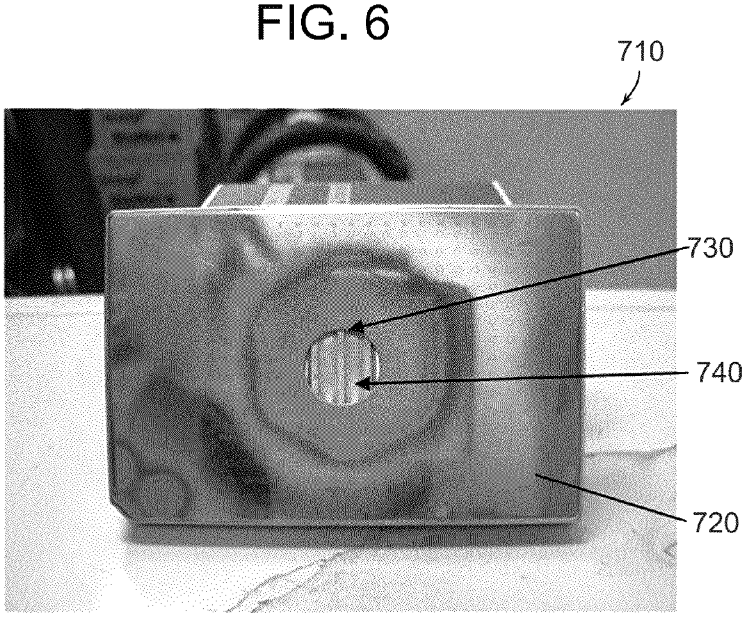

FIG. 2A to 2C perspective views in section of various embodiments of lens assemblies according applicants' teachings;

FIG. 3 is schematic diagram illustrating a cross sectional thermal view of the lens assembly of FIG. 1A according to various embodiments;

FIG. 4 is schematic diagram illustrating a cross sectional thermal view of the lens assembly of FIG. 1A according to various other embodiments;

FIGS. 5A to 5O illustrate debris accumulation on various ion optic components;

FIG. 6 illustrates a graph showing number of arcing incidents as a function of temperature; and FIG. 7 is a diagram illustrating a debris catcher according to various embodiments of applicants' teachings.

DESCRIPTION OF VARIOUS EMBODIMENTS

Various apparatuses or methods will be described below to provide an example of an embodiment of each claimed invention. No embodiment described below limits any claimed invention and any claimed invention may cover apparatuses or methods that are not described below. The claimed inventions are not limited to apparatuses or methods having all of the features of any one apparatus or method described below or to features common to multiple or all of the apparatuses described below. It is possible that an apparatus or method described below is not an embodiment of any claimed invention. The applicants, inventors and owners reserve all rights in any invention disclosed in an apparatus or method described below that is not claimed in this document and do not abandon, disclaim or dedicate to the public any such invention by its disclosure in this document.

Applicants' teachings relate to ion optic lens assemblies and methods of using ion optic components in mass spectrometry. According to applicants' teachings the surfaces of the ion optic components can be configured to resist contaminant deposition. In addition, applicants teachings can be applied to a process whereby any deposited contaminates can be removed without the need for breaking the vacuum in a lens assembly.

Figure 1B:
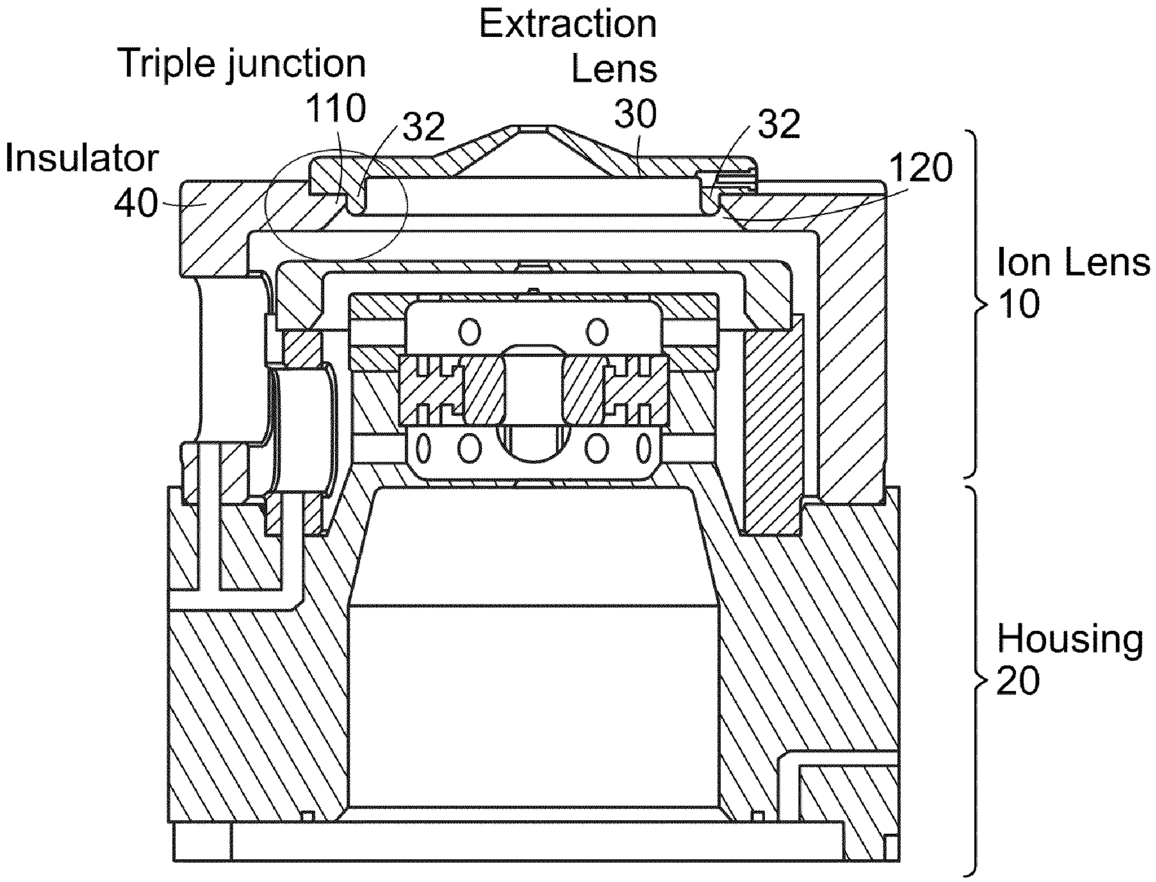
FIG. 1B is schematic diagram illustrating a cross sectional view of the lens assembly of FIG. 1A.

Reference is now made to FIGS. 1A and 1B, which illustrate exploded and cross sectional views respectively of an ion optic lens assembly 5. Lens assembly 5 can be used as an ion lens for focusing ions for use in time-of-flight mass spectrometry (TOF-MS). Lens assembly 5 can also, for example, but not limited to, be used in conjunction with a MALDI ion source.

Lens assembly 5 comprises an ion lens 10 and a housing 20. Ion lens 10 is mounted to housing 20. The mounting can be achieved in any appropriate manner Ion lens 10 comprises a plurality of ion optic components. Specifically, ion lens 10 comprises an extraction lens 30, an extraction lens spacer 40, a focus lens 50, a focus lens spacer 60, a ground lens 70, an Einzel lens 80, and an Einzel lens spacer 90. It should be understood that the term electrode will be used interchangeably with the term lens. Thus, for example, extraction lens 30 can also be referred to as extraction electrode 30.

In various embodiments, the extraction lens 30 and focus lens 50 are comprised of a conductor. In some embodiments, the conductor is molybdenum. In some embodiments, focus lens spacer 60, and Einzel lens spacer 90 are comprised of an insulator. In various embodiments, the insulator is Alumina. In various embodiments, focus ground lens 70 and Einzel lens 80 are comprised of a conductor. In some embodiments, the conductor used for focus ground lens 70 and Einzel lens 80 is stainless steel.

In various embodiments, housing 20 comprises a conductor, which may for example be aluminum. Housing 20 serves as a ground for ion lens 10

One or more heaters 100 are mounted to housing 20. The heaters 100 can be mounted in any appropriate manner. In some embodiments, the heaters 100 are fastened to the housing 20 by screws. Heaters 100 are used to heat the ion lens 10. Specifically, the heaters heat housing 20 which in turn transmits the heat to ion lens 10 and thereby heats the various components of the lens assembly 5. In some embodiments where more than one heater 100 is used, heaters 100 are evenly distributed over the surface of housing 20. As will be discussed in greater detail below, applicants have found that depending on the temperature applied, heat can be used to prevent the accumulation of debris on ion optic components or it can be used to remove debris that has been accumulated.

In addition to heating, some embodiments use additional techniques to minimize the accumulation of debris on the optical components. For example, in various embodiments, the geometry of the optic components is designed to minimize accumulation of debris. For example, to prevent debris from accumulating in pockets behind the insulators, Einzel lens spacer 90 of lens assembly 5 can be designed to be hidden from the ion beam passing through lens assembly 5.

Reference is now made to FIGS. 2A to 2C, which illustrate perspective views in section of various alternative embodiments of source lens assemblies. The embodiments of lens assembly 5*d* and lens assembly 5*e* illustrated in FIGS. 2A and 2C expose Einzel lens insulators 90*d* and 90*e* are exposed to the ion beam.

In contrast to lens assemblies 5*d* and 5*e*, lens assembly 5*f* of FIG. 2C has an Einzel lens insulator 90*f* that is not exposed to the ion beam. As described above, this modification reduces the amount of debris that is accumulated. A further modification of lens assembly 5*f* is the addition of holes 240 to various conductors and insulators. The holes were added in order to improve the vacuum and prevent debris from accumulating.

In various embodiments, the material composition and configuration of the components of lens assembly 5 are selected so that at elevated temperatures, the ion optics continue to, without deviation, pass ions to the mass analyzer. This is in contrast to known TOF-MS ion lens assemblies that can be adversely affected by the application of heat. Specifically, known TOF-MS ion lens assemblies are constructed and operated so as to maintain physical stability of their ion optic components by avoiding any temperature fluctuations between the components and the environment. In particular, heating the ion optic component surfaces of known ion lens assemblies can adversely affect the ion focusing and transmission operation of the ion lens assemblies.

Some of the aspects of lens assembly 5 that allow it to operate at higher temperatures include the fact that in some embodiments, the component materials are selected to have low thermal expansion at the elevated operating temperature in order to minimize any physical change, which can affect the focusing and transmission function. Furthermore, in various embodiments, the materials of the various components of lens assembly 5 are selected to have similar expansion coefficients. In addition, in some embodiments, the component materials are selected to have a high thermal conductivity for allowing maximum heat transfer to the desired surfaces. In some embodiments, epoxy is used to bind one or more components of lens assembly 5. For example, in various embodiments, extraction lens 30 is mounted to an insulator by an epoxy. In various embodiments, a high temperature epoxy is used to ensure that bonding is maintained in the temperature range used.

As described above, in some embodiments, various components are comprised of molybdenum and alumina. One reason for the selection of these two materials to be used together in various embodiments is that their expansion coefficients are similar. In addition, molybdenum and alumina also have very good thermal conductivity. Furthermore, in various embodiments molybdenum is selected in place of other metals such as, for example, stainless steel because of molybdenum's high thermal conductivity. This can be particularly advantageous where the edges around the orifices of the various optical components are thin. The thin edge makes it difficult to conduct heat to these locations. Moreover, areas near the edges of the orifice tend to be locations where ion/matrix transport is the largest. Thus, the selection of a material with high thermal conductivity can make up for the thin geometry around the orifices and thereby conduct sufficient heat to these locations.

Reference is now made to FIGS. 3 and 4, which illustrate the heat distribution within a lens assembly for two different selections of materials. FIG. 3 illustrates a cross-sectional thermal view of lens assembly 5*a* during operation. FIG. 3 shows the temperature of each of the components of lens assembly 5*a* when housing 100*a* is heated to approximately 50° C. In addition, FIG. 3 illustrates the temperature distribution for embodiments where the extraction lens 30*a* and focus lens 50*a* are comprised of molybdenum and the extraction lens spacer 40*a*, focus lens spacer 60*a*, and Einzel lens spacer 90*a* are comprised of Alumina.

Reference is now made to FIG. 4 that illustrates a cross-sectional thermal view of lens assembly 5*b*. Lens assembly 5*b* differs from lens assembly 5*a* in that the extraction lens spacer 40*b*, focus lens spacer 60*b*, and Einzel lens spacer 90*b* are comprised of Techtron™ instead of Alumina. As can be seen lens assembly 5*b* of FIG. 4 has a more varied heat distribution than lens assembly 5*a* of FIG. 3.

As previously described, applicants have found that an elevated operating temperature for ion lens 10 can provide for an unfavorable condition for the accumulation of contaminants on the surfaces of ion lens 10. More specifically, contaminants such as matrix by-products, which are produced during the MALDI process, tend not to deposit on the surfaces of ion lens 10 when the surfaces are heated. Thus, heaters 100 are used to heat the lens assembly so as to prevent or minimize accumulation of debris.

Reference is next made to FIGS. 5A to 5O, which illustrate the effect of heat on debris accumulation. Specifically, these figures illustrate the debris accumulated on various optical components that were operated at various operating temperatures. It should be understood that FIGS. 5A, 5D, 5G, 5J and 5M illustrate unheated ion optic components, FIGS. 5B, 5E, 5H, 5K and 5N illustrate ion optic components operated at 50° C., and 5C, 5F, 5I, 5L and 5O illustrate ion optic components operated at 75° C. The electrodes illustrated in FIGS. 5A, 5D, 5G, 5J and 5M are from a different model ion lens assembly than that of the other figures. However, this does not significantly impact the results.

FIGS. 5A to 5C, illustrate front views of extraction electrodes. FIGS. 5D to 5F illustrate close up views of the orifice of the extraction electrodes. FIGS. 5G to 5I illustrate a similar view of extraction electrode as FIGS. 5A to 5C, except that in FIGS. 5G to 5I the electrodes are illuminated with black light to more clearly show the contamination or debris buildup. FIGS. 5J to 5L illustrate rear views of the Extraction electrodes. FIGS. 5M to 5O illustrate front views of focus lenses.

As can be seen from the figures, the higher the temperature the lower the amount of debris buildup. The debris buildup is best seen in FIGS. 5D to 5F, where the debris or contamination is illustrated as 515. The radius of the debris 515 around the orifice of the electrode illustrated in FIG. 5F is the smallest of the three and the debris 515 around the orifice of the electrode illustrated in FIG. 5D is the largest of the three.

However, applicants have found that in various embodiments, in which lens assembly 5 is heated above a threshold temperature, arcing can occur between various components of lens assembly 5. Reference is now made to FIG. 6, which illustrates a graph of arcing incidents as a function of temperature for various embodiments of lens assembly 5. As can be seen from the graph, no arcs were observed below 55° C. However, arcing was observed above 55° C. Thus, in various embodiments, the operating temperature is set below the temperature at which arcing occurs.

In various embodiments, heaters 100 are used to set the operating temperature of the lens assembly 5 to a first temperature. In some embodiments, the first temperature is approximately 50° C. As mentioned above, this is below the arcing temperature threshold observed for lens assembly 5. The operating temperature is applied during normal operation of the lens assembly.

As discussed above, heating inhibits the deposition of contaminants on the surfaces of lens assembly 5. However, in various embodiments, some contamination continues to accumulate. This was illustrated in FIGS. 5A to 5O above. The issue of accumulation of debris despite an elevated operating temperature occurs in part as a result of the use of high throughput lasers used in some MALDI ion source techniques. In particular, these high throughput lasers process many samples every second and produce a large amount of debris and contaminants. Consequently, some debris and contaminations continue to accumulate on the ion optic components despite the higher operating temperature.

In some embodiments, a second temperature, which is higher than the first temperature is periodically applied to the ion optic components to remove or drive-off deposited contaminants. This second higher temperature can be referred to as the bake-out temperature and its application will be referred to as a bake-out. In some embodiments the bake-out temperature is approximately 190° C. In various other embodiments, other bake-out temperatures are used. In some embodiments, the bake-out is performed when workflow has stopped. For example, this could be done overnight when ion optics are not in use. In various embodiments, the bake-out process can be performed either when the need arises, such as when a performance loss is detected beyond a set threshold, or as a scheduled event after a predetermined number of samples have been analyzed. In some embodiments, the period is substantially equal to a week. In other embodiments, the period is substantially equal to 5 days. In some other embodiments, the period is measured in terms of the number of samples processed rather than the time elapsed between the first and last samples. In various embodiments in which the bake-out times are determined by performance loss, the set threshold is 50% of peak performance. It should be understood that in other embodiments the performance threshold can be set to other values other than 50% of peak performance.

During the bake-out accumulated debris fall off the ion optics. Accordingly, a debris catcher can be placed under the lens assembly to collect the debris. Reference is now made to FIG. 7, which illustrates a debris catcher 710 for use during the bake-out process. Debris catcher 710 is deposited below the lens assembly 5 during the bake-out process for collecting debris that falls off the lens assembly 5. In some embodiments, debris catcher 710 comprises a planar surface 720 with an orifice 730. Orifice 730 exposes a surface with a plurality of channels 740. In various embodiments, the debris catcher is comprised of one or more metals. The temperature of the catcher is kept sufficiently low such that the various metallic surfaces attract condensation, which in turn attracts the debris. This assists in maintaining the debris on the debris catcher and can help prevent the debris from being removed by slight air currents.

In various embodiments, the bake-out temperature is above the arcing threshold temperature and therefore arcing may occur during the bake-out. Accordingly, in some embodiments, certain features are designed to reduce the occurrence of arcing. Reference is again made to FIG. 1B. Arcing can originate at triple junction 115, which is the common edge of extraction lens 30, insulator 40, and vacuum 120. In order to minimize the occurrence of arcing, in some embodiments of applicants' teachings, a triple junction 110 is shaped so as to minimize the concentration of electric fields at the triple junction 110. In some embodiments, this is accomplished by shaping extraction electrode 30 to have a protrusion 32 that spans the entire length of triple junction 110.

In some embodiments, various additional measures are used to minimize arcing. For example, in some embodiments, all the edges of the electrodes are smoothed. In addition, in various embodiments the ion optic components are coated with a glaze to prevent scratching. In particular, in some embodiments, the metallic parts are nickel plated for increased durability. Scratches can easily result from the hard ceramic parts that are used with the metals in the lens assembly if the ceramic parts are not covered in a protective glaze. Any scratches that do develop can provide pathways for currents, which in turn result in a creeping voltage difference between various ion optic components. This creeping voltage can result in the occurrence of increased arcing.

While the applicants' teachings are described in conjunction with various embodiments, it is not intended that the applicants' teachings be limited to such embodiments. On the contrary, the applicants' teachings encompass various alternatives, modifications, and equivalents, as will be appreciated by those of skill in the art.

The invention claimed is:

1. A lens assembly for use in mass spectrometry, the lens assembly comprising:

a plurality of ion optic components comprising at least one lens component and at least one insulator, the at least one lens component and the at least one insulator having a generally similar expansion coefficient; and a heater positioned proximate to the ion optic components, the heater heating the ion optic components to a temperature that reduces an accumulation of debris on the ion optic components.

2. The lens assembly of claim 1, further comprising a housing, the housing mounted to the plurality of ion optic components.

3. The lens assembly of claim 2, wherein the heater is mounted to the housing.

4. The lens assembly of claim 2, wherein the heater is a plurality of heaters operatively coupled to the ion optic components.

5. The lens assembly of claim 2, wherein the heater is a plurality of heaters operatively coupled to the ion optic components, the plurality of heaters evenly distributed across a perimeter of the housing.

6. The lens assembly of claim 1, wherein the plurality of ion optic components further comprise an extraction lens, the extraction lens and at least one of the at least one insulator define a common edge, and the extraction lens and the insulator are shaped to minimize an electric field concentration at the common edge.

7. The lens assembly of claim 6, wherein the extraction lens includes a protrusion extending the length of the common edge.

8. The lens assembly of claim 6, wherein the extraction lens includes a plurality of holes, the holes allowing airflow.

9. The lens assembly of claim 6, wherein the extraction lens is comprised of molybdenum.

10. The lens assembly of claim 6, wherein the plurality of ion optics components further comprise:

a focus lens operatively coupled to the extraction lens;

a ground lens operatively coupled to the focus lens; and an Einzel lens operatively coupled to the ground lens.

11. The lens assembly of claim 10, wherein the focus lens is comprised of molybdenum.

12. The lens assembly of claim 1, wherein the insulator is comprised of alumina.

13. The lens assembly of claim 1, wherein at least a portion of the lens assembly is coated with a glaze.

14. A method for reducing contaminant build up on ion optic components in a lens assembly for use in a mass spectrometer, the method comprising:

receiving in a lens assembly ions from an ion source, the lens assembly including a plurality of ion optic components assembled to form an ion lens, at least some of the plurality of ion optic components having a generally similar expansion coefficient; and heating the ion optic components to a first temperature that reduces an accumulation of debris on the ion optic components.

15. The method of claim 14, further comprising periodically stopping operation of the mass spectrometer and heating the ion optic components to a second temperature.

16. The method of claim 15, wherein the second temperature is higher than the first temperature.

17. The method of claim 15, wherein the period is determined when sensitivity falls below a threshold.

18. The method of claim 17, wherein the threshold is greater than 50% of initial sensitivity.

19. The method of claim 15, wherein the period is substantially equal to a week.

20. The method of claim 16, wherein the ion source is a MALDI ion source.

21. The method of claim 20 wherein matrix is collected, the operation is stopped, and the ion optic components are heated to a second temperature.

22. The method of claim 21, wherein the step of collecting matrix comprises providing a surface under the source lens.

23. The method of claim 22, wherein the surface is at a third temperature, and wherein the third temperature is lower than the second temperature.

24. The method of claim 23, wherein the third temperature is sufficiently low to induce condensation on the surface.

25. The method of claim 14, wherein the first temperature is greater than 45° C.

26. The method of claim 14, wherein the first temperature is approximately 50° C.

27. The method of claim 15, wherein the second temperature is approximately 190° C.

28. The method of claim 14 wherein a first temperature is less than or equal to 55° C.

* * * * *